US006928472B1

(12) United States Patent
Wen (10) Patent No.: US 6,928,472 B1
(45) Date of Patent: Aug. 9, 2005

(54) METHOD FOR CORRELATING CONGESTION TO PERFORMANCE METRICS IN INTERNET TRAFFIC

(75) Inventor: Han C. Wen, San Jose, CA (US)

(73) Assignee: Network Physics, Mountain View, CA (US)

( * ) Notice: Subject to any disclaimer, the term of this patent is extended or adjusted under 35 U.S.C. 154(b) by 361 days.

(21) Appl. No.: 10/205,101

(22) Filed: Jul. 23, 2002

(51) Int. Cl.[7] ............................................. G06F 15/173
(52) U.S. Cl. ...................... 709/223; 709/224; 370/241; 370/242; 702/181; 702/182
(58) Field of Search ................ 709/223, 224, 709/235; 370/241, 242, 244; 702/181–183, 185

(56) References Cited

U.S. PATENT DOCUMENTS

| 5,706,436 A | * | 1/1998 | Lewis et al. ................. 709/235 |
| 2002/0004827 A1 | * | 1/2002 | Ciscon et al. ................ 709/223 |
| 2002/0099818 A1 | * | 7/2002 | Russell et al. ............... 709/224 |

OTHER PUBLICATIONS

Floyd Bullard, "A Brief Introduction to Bayesian Statistics", pp. 1–14, NCTM 2001.
Tianhang Hou, Lloyd C. Huff, and Larry Mayer, "Automatic Detection of Outliers in Multibeam Echo Sounding Data", University of New Hampshire, pp. 1–12.
Igor V. Cadez and P.S. Bradley, "Model BAsed Population Tracking and Automatic Detection of Distribution Changes" pp. 1–8.
Edwin M. Knorr and Raymond T. Ng, "A Unified Approach for Mining Outliers", Universityof British Columbia, pp. 1–13.
Mark Last and Abraham Kandel, Automated Detection of Outliers in Real–World Data, pp. 1–10.
Dantong Yu, Gholam Sheikholeslami and Aidong Zhang, "Find Out: Finding Outliers in Very Large Datasets", University of New York at Buffalo, pp. 1–19.
Hiroyuki Ohsaki, Mitsushige Morita and Masayuki Murata, "Measurement–Based Modeling of Internet Round–Trip Time Dynamics using System Identification", pp 1–20.
Polly Huang, Anja Feldmann and Walter Willinger, "A non–intrusive, wavelet–based approach to detecting network performance problems", pp. 1–15.
Matthew Mathis, Jeffrey Semke and Jamshid Mahdavi, "The Macroscopic Behavior of the TCP Congestion Avoidance Algorithm", ACM SIGCOMM, vol. 27, No. 3, (Jul. 1997), pp. 1–16.
Nevil Brownlee and Chris Loosley, "Fundamentals of Internet Measurement: A Tutorial" Keynote, May 1, 2001) pp. 1–14.
M. Mathis and M. Allman, "A Framework for Defining Empirical Bulk Transfer Capcity Metrics", (Jul. 2001), pp. 1–16.

(Continued)

Primary Examiner—Frantz B. Jean
(74) Attorney, Agent, or Firm—Blakely, Sokoloff, Taylor & Zafman LLP (57) ABSTRACT

For each of a number of network performance metrics, an associated value $r_{pm}$ that represents a difference between a first correlation coefficient $r_1$ computed for a baseline data set and a second correlation coefficient $r_2$ computed for a second data set that includes the baseline data set and other data points classified as duration outliers is computed. The first and second correlation coefficients for each network performance metric represent correlation between that network performance metric and durations of network connections. The network performance metric that has a largest associated $r_{pm}$ value of all $r_{pm}$ values computed is selected as representing the probable root cause of the duration outliers.

10 Claims, 5 Drawing Sheets

OTHER PUBLICATIONS

G. Almes, S. Kalidindi and M. Zekauskas, "A Round–Trip Delay Metric for IPPM", Internet Society (Sep. 1999), pp. 1–20.

G. Almes, S. Kalidindi and M. Zekauskas, "A One–Way Packet Loss Metric for IPPM", Internet Society (Sep. 1999), pp. 1–15.

G. Almes, S. Kalidindi and M. Zekauskas, "A One–Way Metric for IPPM", Internet Society (Sep. 1999), pp. 1–20.

J. Mahdavi and V. Paxson, "IPPM Metrics for Measuring Connectivity", Internet Society, (Sep. 1999), pp. 1–10.

V. Paxson et al., "Framework for IP Performance Metrics" Internet Society, (May 1998), pp. 1–40.

Vern Paxson, "End–to–End Routing Behavior in the Internet", University of California, (May 23, 1996), pp. 1–23.

Swdiv and Efawest, "Handbook for Statistical Analysis of Environment Background Data", Naval Facilities Engineering Command, (Jul. 1999), pp. 1–83.

Surendra P. Verma, "Sixteen Statistical Tests for Outlier Detection and Rejection in Evaluation of International Geochemical Reference Materials: Example of Microgabbro PM–S", Geostandards Newsletter, vol. 21, No. 1, (Sep. 26, 1996) pp. 59–75.

Kenneth C. Glossbrenner, Approved Test for new Recommendation 1.380: "Internet Protocol, Data Communication Service—IP Packet Transfer and Availability Performance Parameters", AT&T, (May 3, 1999), pp. 1–28.

V. Rais, G. Grote and A. Mo, "Network Performance measurement With Periodic Streams", AT&T, pp. 1–31.

Rajeev K and R. Ravi, "One–Way Loss Pattern Sample Metrics Draft–ietf–ippm–loss–pattern–07.txt", IPPM Working Group, (Mar. 28, 2002).

C. Demic and P. Chi, "IP Packet Delay Variation Metric for IPPM", Network Working Group, (2002), pp. 1–31.

Vern Paxson and Sally Floyd, "Why We Don't Know How to Simulate the Internet", University of California, (Dec. 1997), pp. 1–8.

Edwin M. Knorr and Raymond T. Ng, "Algorithms for Mining Distance–Based Outliers in Large Datasets", University of British Columbia, (1998), pp. 1–12.

Vern Paxson, Measurements and Analysis of End–to–End Internet Dynamics, University of California, (Apr. 1997), pp. 1–392.

* cited by examiner

METHOD FOR CORRELATING CONGESTION TO PERFORMANCE METRICS IN INTERNET TRAFFIC

FIELD OF THE INVENTION

The present invention relates to a method for determining the cause of congestion in computer networks based on correlations between measured performance metrics and network connection durations.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no control is exercised, as the load increases, use increases for a while. Then, as the queue lengths at various nodes begin to grow, throughput actually drops. This is due, in part, to the retransmission of dropped packets, and it is common for this condition to be described as "congestion". It is clear that catastrophic network failures due to congestion should (indeed, must) be avoided and preventing such failures is the task of congestion control processes within packet switched networks. As a starting point for such processes, however, one must be able to determine when and where congestion is occurring.

Any attempt to measure congestion (which for purposes of this discussion shall be regarded more formally as anomalous deviations in the end-to-end response time or duration of a connection) necessarily requires the gathering of some network performance information. This raw information may relate to a variety of network "metrics" as defined by the Internet Engineering Task Force (IETF) in a series of Requests for Comments (RFCs) as follows:

a. RFC 2330, entitled "Framework for IP Performance Metrics" (May 1998), define a general framework for particular metrics to be developed by the IETF's IP Performance Metrics effort, begun by the Benchmarking Methodology Working Group (BMWG) of the Operational Requirements Area, and being continued by the IP Performance Metrics Working Group (IPPM) of the Transport Area.

b. RFC 2678, entitled "PPM Metrics for Measuring Connectivity" (September 1999), defines a series of metrics for connectivity between a pair of Internet hosts. It builds on notions introduced and discussed in RFC 2330, the IPPM framework document.

c. RFC 2679, entitled A One-way Delay Metric for IPPM" (September 1999), defines a metric for one-way delay of packets across Internet paths.

d. RFC 2680, entitled "A One-way Packet Loss Metric for IPPM" (September 1999), defines a metric for one-way packet loss across Internet paths.

e. RFC 2681, entitled "A Round-trip Delay Metric for IPPM" (September 1999), defines a metric for round-trip delay of packets across Internet paths.

f. A draft RFC entitled "IP Packet Delay Variation Metric for IPPM" (April 2002) refers to a metric for variation in delay of packets across Internet paths. The metric is based on the difference in the One-Way-Delay of selected packets. This difference in delay is called "IP Packet Delay Variation".

g. A draft RFC entitled "One-Way Loss Pattern Sample Metrics" (March 2002) uses the base loss metric defined in RFC 2680 to define two derived metrics, "loss distance" and "loss period", and the associated statistics that together capture loss patterns experienced by packet streams on the Internet. The authors postulate that the loss pattern or loss distribution is a key parameter that determines the performance observed by the users for certain real-time applications such as packet voice and video. For the same loss rate, two different loss distributions could potentially produce widely different perceptions of performance.

h. A draft RFC entitled "Network Performance Measurement with Periodic Streams" (April 2002) describes a periodic sampling method and relevant metrics for assessing the performance of IP networks.

Regardless of the metric of used, however, the volume of data obtained from any real world network generally requires that the data be analyzed using statistical tools in order to arrive at conclusions about the network's performance. However, this can lead to unsatisfactory results. For example, one may wish to consider duration outliers as evidence of congestion episodes (see, e.g., the discussion in U.S. patent application Ser. No. 10/195,904, entitled "Method for Detecting Congestion in Internet Traffic", filed Jul. 15, 2002, incorporate herein by reference and assigned to the same assignee as the present application). Outliers are generally regarded as observations that deviate so much from other observations of the same dataset as to arouse suspicions that they were generated by a different mechanism. See, e.g., Edwin M. Knorr and Raymond T. Ng., "Algorithms for Mining Distance-Based Outliers in Large Datasets", Proc. $24^{th}$ VLDB Conf. (New York 1998).

Difficulties arise in correlating duration outliers to performance metrics such as round trip time (RTT) because these two variables are naturally correlated, irrespective of any outliers. Therefore, the correlation between these variables, as measured by the value of the correlation coefficient (r), is not a reliable indicator of the correlation between duration outliers (which tend to indicate congestion) and that metric. Thus, a new approach is needed.

SUMMARY OF THE INVENTION

For each of a number of network performance metrics, an associated value $r_{pm}$ that represents a difference between a first correlation coefficient $r_1$ computed for a baseline data set and a second correlation coefficient $r_2$ computed for a second data set that includes the baseline data set and other data points classified as duration outliers is computed. The first and second correlation coefficients for each network performance metric represent correlation between that network performance metric and durations of network connections. The network performance metric that has a largest associated $r_{pm}$ value of all $r_{pm}$ values computed is selected as representing the probable root cause of the duration outliers.

BRIEF DESCRIPTION OF THE DRAWINGS

The present invention is illustrated by way of example, and not limitation, in the figures of the accompanying drawings in which.

DETAILED DESCRIPTION

Described below is a method for correlating a congestion episode to performance metrics in Internet traffic. Congestion in this context is defined as anomalous deviations in the end-to-end response time or duration of a connection. These anomalies are referred to as duration outliers, for which the average duration over a given time interval exceeds a threshold value. When one or more contiguous time intervals are each characterized by duration outliers, then the total interval time will be referred to as a congestion episode.

In the following description examples of various performance metrics that may be used in determining the cause of congestion episodes are set forth. These examples, however, are not meant to be restrictive. Thus, the true measure of the present invention should not be restricted to the examples set forth below, but rather should be consistent with the scope of the claims which follow that discussion.

Figure 1:
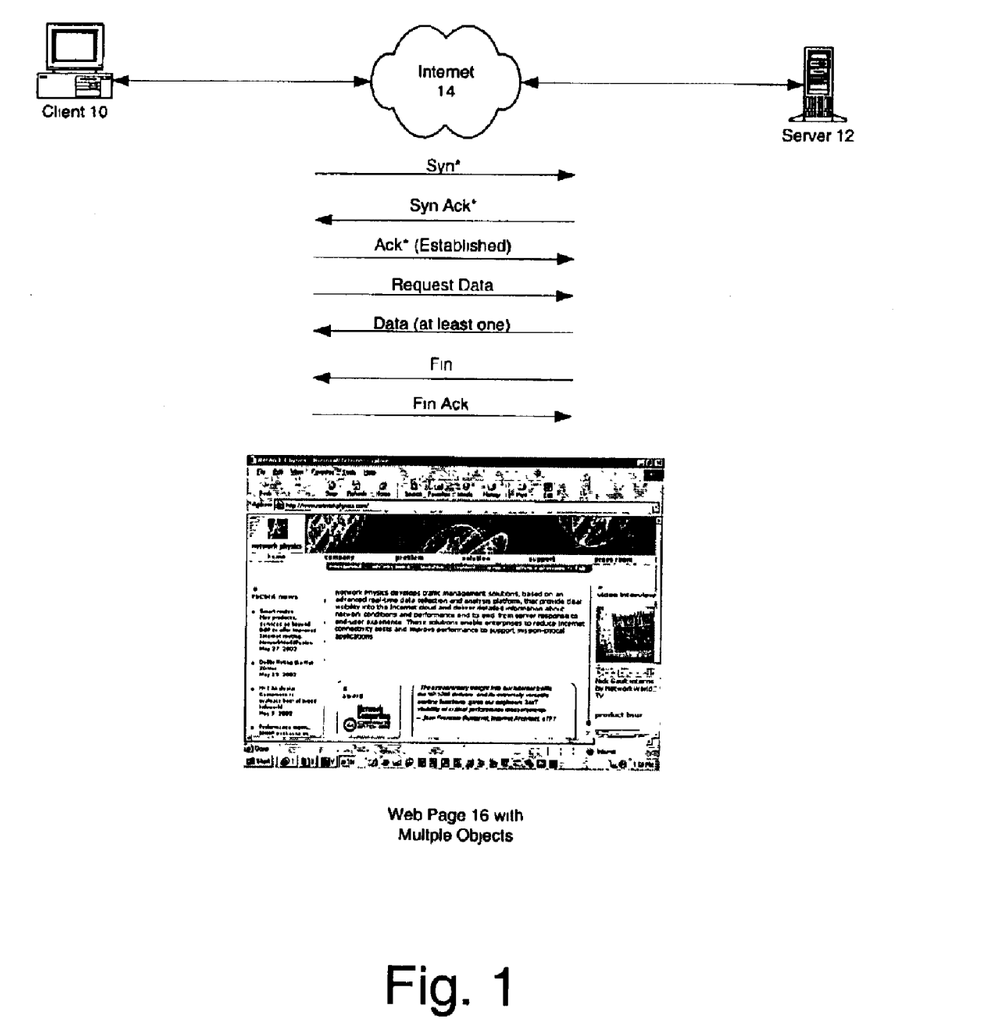
FIG. 1 illustrates an example of an Internet connection between a client and a server.

Before discussing the present invention in detail, some background regarding Internet connections and the like is useful. FIG. 1 shows a typical interaction between a client 10 and a server 12 across the Internet 14. In this case, the client 10 is a Web browser application that executes on a personal computer. When a client 10 such as a Web browser requests content (i.e., data resident on the server 12), dozens of round trips must take place between the client 10 and the distant server 12. This is because a Web page 16 is typically composed of dozens of objects, and for each object there typically must first be a connection set up between the client 10 and the server 12.

At this point it is useful to recognize that a so-called "Web page" 14 really is not a "page" in the traditional sense of a page in a book. Nor is it even really a "document". Instead, a Web page 14 is a set of computer instructions (usually written in the hypertext markup language or HTML) containing a list of embedded object references. The computer instructions tell the client 10 how to retrieve, organize and, if appropriate, display the objects on the screen of the personal computer. The objects may be files, images, applets (small computer programs), or any other resource and are usually referenced by a uniform resource identifier (URI), which acts as a unique address for the object.

As shown in the illustration, the process of downloading each of these objects in order to properly display the Web page 16 requires that the client 10 exchange a number of "handshakes" with the server 12 in order to establish the connection. Only once a connection has been established can the object be downloaded. Afterwards, the connection is terminated and the process repeats for another object until all of the objects referenced in the Web page 16 have been downloaded to the client 10. Typical Web browsers can open up to four concurrent connections with a server so that four separate objects may be concurrently downloaded. Nevertheless, multiple round trips between client 10 and Web server 12 are often necessary for the opening and closing of connections to retrieve a single Web page 16.

In determining whether or not congestion exists in a network (be it the Internet or another network) it is useful to consider the "duration" of a connection. In this context, duration is defined as the end-to-end (e.g., client to server and back to client) response time of a connection. This is not necessarily the total time required for a Web page or even an object to download. Instead, it is best thought of as the time taken between the first packet of a request transmitted by a client and the first packet of a response from the server received at the client. Thus, this duration includes such variables as server response time in addition to the actual time required for a packet to transit the Internet. Nevertheless, duration is a useful measure of congestion because as viewed from the user's point of view it is a meaningful metric. Congestion will be deemed to exist if duration outliers are observed in a study of a duration time series.

There are many statistical tests that have been developed to identify outliers for a given variable. Examples of such statistical tests include Grubb's Test, Rosner's Test and Walsh's Test. In the above-cited U.S. patent application, a new method for determining duration outliers is proposed that, unlike conventional outlier tests, makes use of information from multiple performance metrics.

Regardless of the method used to detect outliers, however, it is necessary to collect data from the network under evaluation. Duration data can be gathered in a variety of ways. For example, when installed in a network the Internet Traffic Manager™ NP-1000 produced by Network Physics, Inc. of Mountain View, Calif., the assignee of the present invention, is capable of monitoring and recording a wide range of network metrics, which can be displayed via tables, charts, and topological diagrams for all traffic through the NP-1000, or for user-specified groups of servers, autonomous systems, or clients. The data can be resolved to various granularities for various time periods. In addition to duration data, the NP-1000 can also collect the other performance metric data (e.g., connection payload or file size, server response time, packet loss rate, and latency or round-trip time (RTT) to name a few) discussed below.

Once duration data (e.g., for one or a group of specified clients, routes, servers, networks, or any other category of choice) has been collected, it can be analyzed to determine if congestion episodes are present. As indicated above, this determination is made by looking for outliers in the duration data. Durations that exceed established norms are categorized as outliers and the associated clients, routes, etc. are identified as experiencing congestion.

Although this process will identify the existence of congestion episodes, the question remains as to what the root cause of the congestion is. The present method may be used to uncover the likely root cause of the anomalous durations (i.e., the outliers) in order to provide network operators and others with greater understanding of the true network conditions. The method involves using a change in correlation coefficient (as calculated between selected performance metrics and the duration data) as a measure of the correlation between duration outliers and a given performance metric.

The change in correlation coefficient is defined as the difference between coefficients calculated between duration and a performance metric for two data sets. The first data set is a baseline, consisting of all the intervals that do not have duration outliers. The second data set consists of the same baseline data plus all time intervals with duration outliers associated with the current congestion episode. An increase in correlation coefficient from the first data set to the second data set indicates that the addition of the duration outliers introduces a stronger correlation to the performance metric under consideration beyond that which exists between duration and the performance metric irrespective of any congestion.

The above procedure is applied between duration and each desired performance metric. The performance metric that results in the largest increase in correlation coefficient is identified as the most probably root cause of the anomalous durations. That is, it is the performance metric most likely associated with the congestion episode.

A correlation coefficient is a measure of the relationship between two variables. Sometimes in scientific data it appears that two variables are connected in such a way that when one variable changes the other variable changes also. This connection is called a correlation. The strength of the relationship between these two variables is measured by calculating a correlation coefficient. The value of the correlation coefficient indicates to what extent the change found in one variable relates to change in another. There are several types of correlation coefficients, but the one that is most widely used is called the Pearson Product-Moment Correlation Coefficient, or simply the Pearson, r.

The correlation coefficient is a statistical measure of relationship ranging from −1.00 (a perfect negative relationship) to 0.00 (no relationship) to +1.00 (a perfect positive relationship). The closer the correlation coefficient is to 1 (either positive or negative), the stronger the relationship is. For example, a correlation coefficient of +0.89 indicates a very strong positive relationship between two variables, whereas −17 suggests a very weak negative relationship between two variables. The correlation coefficient r between two variables x and y may be calculated as follows:

$$r_{xy} = \frac{\sum xy - \frac{1}{n}(\sum x)(\sum y)}{\sqrt{\left\{\sum (x^2) - \frac{(\sum x)^2}{n}\right\} * \left\{\sum (y^2) - \frac{(\sum y)^2}{n}\right\}}}$$

Once a correlation coefficient has been calculated for a set of data points, it remains to be determined whether or not the calculation has statistical significance. To do this the 'critical value' for the correlation coefficient is compared against a chart of known values. If the calculated value of r for the number of degrees of freedom presented by the system under test is greater than the critical value found in the chart, then one can assume that the correlation is not due to chance.

Figure 2:
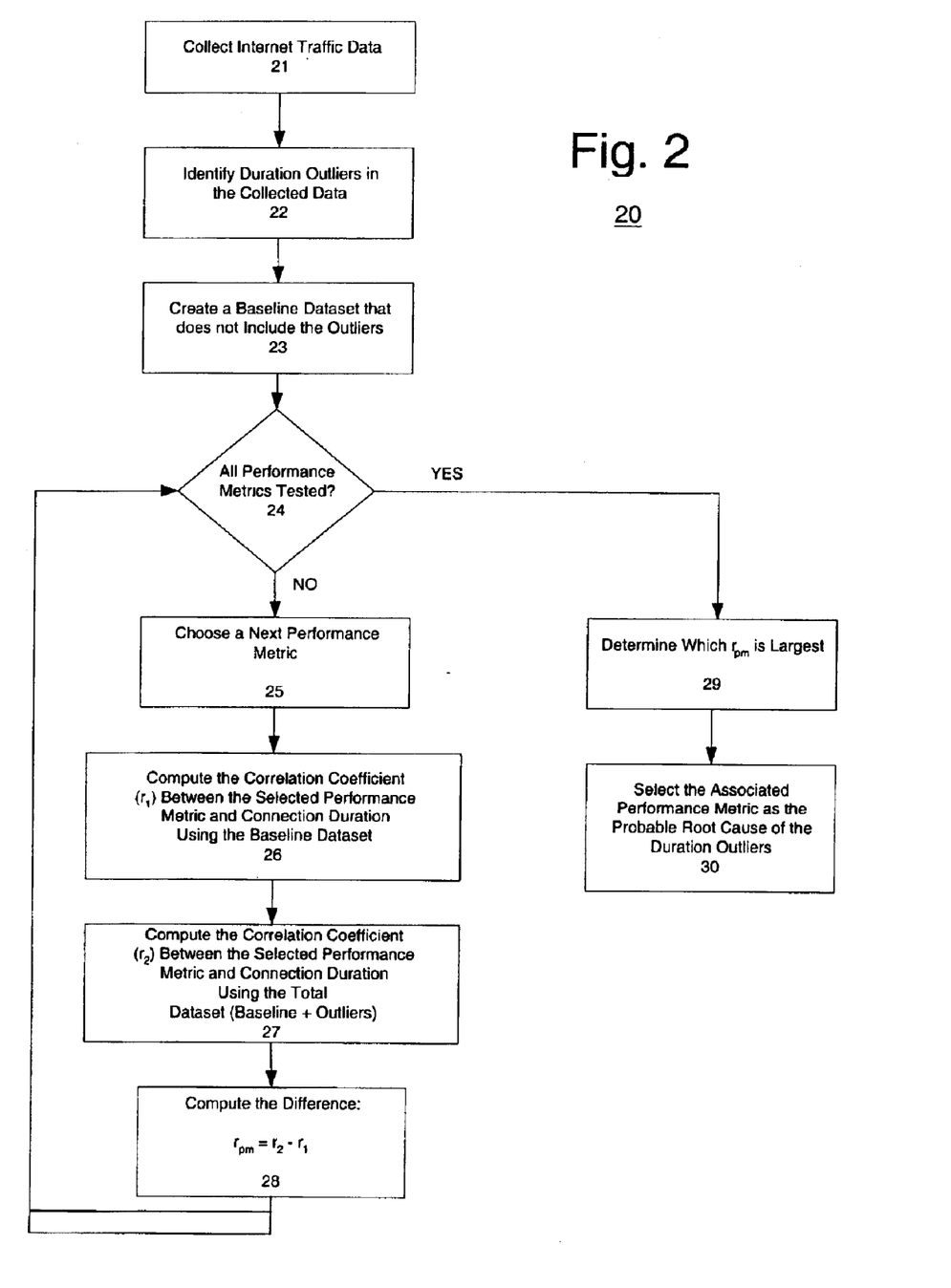
FIG. 2 illustrates an example of a process for determining which of a number of performance metrics is probable cause of duration outliers in network traffic in accordance with the present invention.

FIG. 2 illustrates an example of a procedure 20 for determining which performance metric is the probable root cause of congestion within a network in accordance with the present invention. At step 21, the Internet traffic data is collected. As indicated above, the NP-1000 may be used to collect the data or other appropriate instruments may be used for this purpose. In addition to collecting data regarding connection duration, data regarding as many performance metrics as desired can also be collected. In particular, data regarding RTT, server response time, file size and/or packet loss may be collected.

Once the traffic data has been collected, duration outliers are identified at step 22. As indicated above, the identification of these outliers may be performed using conventional statistical tests or, preferably, using the methods described in the above-cited U.S. patent application. Once the outliers are identified, a baseline data set that excludes time intervals containing these outliers can be established at step 23. The original data set that includes the outliers is also retained for further use as discussed below.

One the two datasets have been established, a process for determining changes in correlation coefficients associated with each performance metric beings at step 24. That is, for each performance metric of interest (step 25), two correlation coefficients are computed. The first (computed at step 26) measures the correlation between the performance metric under test and duration using the baseline dataset that does not include the time intervals for the duration outliers. This produces a correlation coefficient $r_1$. The second (computed at step 27) measures the correlation between the performance metric under test and duration using the dataset that does include the time intervals for the duration outliers. This produces a correlation coefficient $r_2$. Note that it does not matter in which order $r_1$ and $r_2$ are computed and in some embodiments these values may be computed in parallel.

Once the two correlation coefficients have been computed, the difference in those values, $r_{pm}=r_2-r_1$ is computed at step 28. The value $r_{pm}$ represents the change in correlation coefficient for the performance metric (pm) under test. If $r_{pm}$ is positive, this indicates a stronger correlation between the performance metric under test and duration than that which exists irrespective of any congestion.

The above procedure is repeated (step 25) until values $r_{pm}$ for all performance metrics of interest have been computed. Then, at step 29, a determination is made as to which $r_{pm}$ value is the largest. The performance metric associated with the largest $r_{pm}$ value is then identified as the most probable root cause of the anomalous duration outliers (step 30).

By way of example, consider a case where the performance metric of interest is RTT. Suppose duration and RTT data for Internet traffic was collected over a period of time and a baseline dataset determined therefrom. Excluded from the baseline dataset were five data points representing what were determined to be duration outliers.

Continuing our example, using the above method a baseline correlation coefficient was determined to be 0.4. Then, when the five data points associated with the outliers were added to the baseline, a resulting correlation coefficient for the second data set was found to be 0.9. This represents an increase of 0.5. If additional changes in correlation coefficients were computed for other performance metrics, but none were greater than 0.5, we would conclude that RTT was the probable cause of the anomalous durations represented by the outliers.

This sort of calculation does, however, lead to the question of identifying the significance in any increase in correlation coefficient. That is, was the increase of 0.5 in the above example really due to the outliers, or could it be due to natural fluctuations in the data? To address this issue, a Bayesian method for determining the statistical uncertainty in correlation coefficient when the baseline data set is incremented by some amount is proposed.

Bayesian methods are an example of inferential statistical analysis. Inferential statistics is a branch of statistics that attempts to make valid predictions based on only a sample of all possible observations. For example, imagine a bag of 10,000 marbles. Some are black and some white, but of which the exact proportion of these colors is unknown. It is unnecessary to count all the marbles in order to make some statement about this proportion. A randomly acquired sample of 1,000 marbles may be sufficient to make an inference about the proportion of black and white marbles in the entire population. If 40% of the sample is white, then we may be able to infer that about 40% of the total population are also white.

To some, this process may seem rather straightforward. In fact, it might seem that there is no need to even acquire a sample of 1,000 marbles. A sample of 100 or even 10 marbles might do. This is assumption is not necessarily correct. As the sample size becomes smaller, the potential for error grows. For this reason, inferential statistics has developed numerous techniques for stating the level of confidence that can be placed on these inferences. However, classical inferential models do not permit the introduction of prior knowledge into the calculations, even if this knowledge might be useful in coming to a conclusion. Nevertheless, there are times when the use of prior knowledge would be a useful contribution to the evaluation process. Bayes' Theorem, developed by the Rev. Thomas Bayes, an 18th century mathematician and theologian allows for the use of such prior knowledge.

Without delving into the mathematics of Bayes Theorem, which are well known in the art, the present method makes use of the principles underlying the theorem in determining the statistical significance of changes in correlation coefficients as computed above as follows. Let the number of time intervals of duration outliers for a current congestion episode be labeled as M. Select M random data points from the baseline data set and add them with the baseline data set to produce a new Bayesian data set. Then, calculate the correlation coefficient between duration and the performance metric of interest for this Bayesian data set and repeat this process until a statistically significant number of correlation coefficients have been accumulated (e.g., approximately 100 times).

Now calculate either the root mean square or standard deviation of these new Bayesian correlation coefficients. The resulting value (which may be called "sigma" ($\sigma$)) represents an estimate of the uncertainty in correlation coefficient when the baseline data set is increased by M data points. If the value of the change in correlation coefficient, $r_{pm}$, for the performance metric of interest is greater than the corresponding $\sigma$ value, then the corresponding performance metric has been identified as the root cause of the duration outliers for the current congestion episode.

Figure 3A:
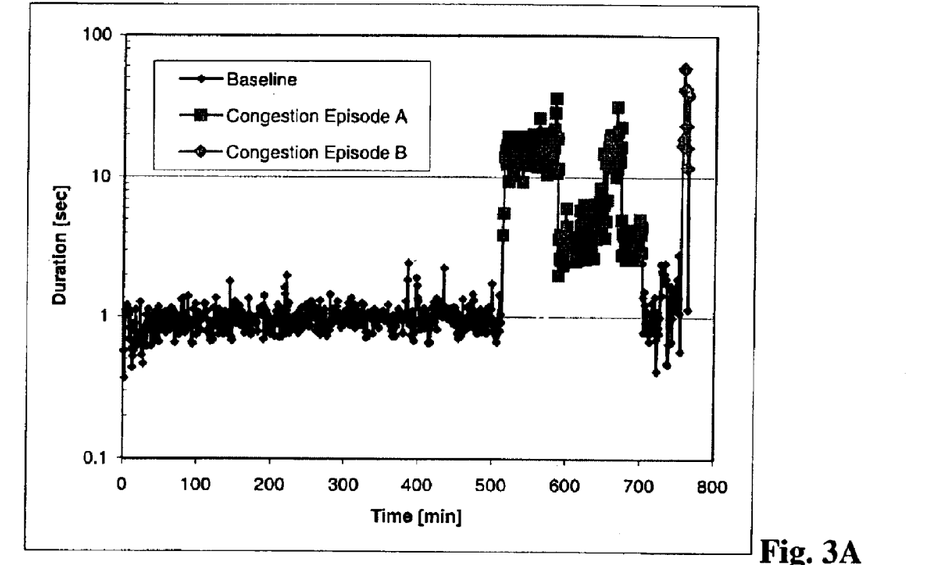
FIGS. 3A–3E illustrate an example of Internet traffic data collected for a variety of performance metrics over a time interval and show how the present methods may be used to determine which of the different performance metrics is the probable cause of duration outliers in the network traffic data.

In order to demonstrate the effectiveness of the present methods, consider FIGS. 3A–3E, which illustrate an example of Internet traffic data collected for a variety of performance metrics over a time interval and show how the present methods may be used to determine which of the different performance metrics is the probable cause of duration outliers in the network traffic data. More specifically, FIG. 3A is a plot of Internet traffic duration data collected over a time interval of approximately 750 min. By examining this plot, one can discern a long period with no significant duration outliers (the baseline data at the left of the plot), followed by two separate congestion episodes (Congestion Episode A and Congestion Episode B) that are characterized by a large number of duration outliers. Recall that duration outliers are taken to be indications of congestion in the network. The question then is which performance metric is most likely responsible for these congestion episodes.

Figure 3B:
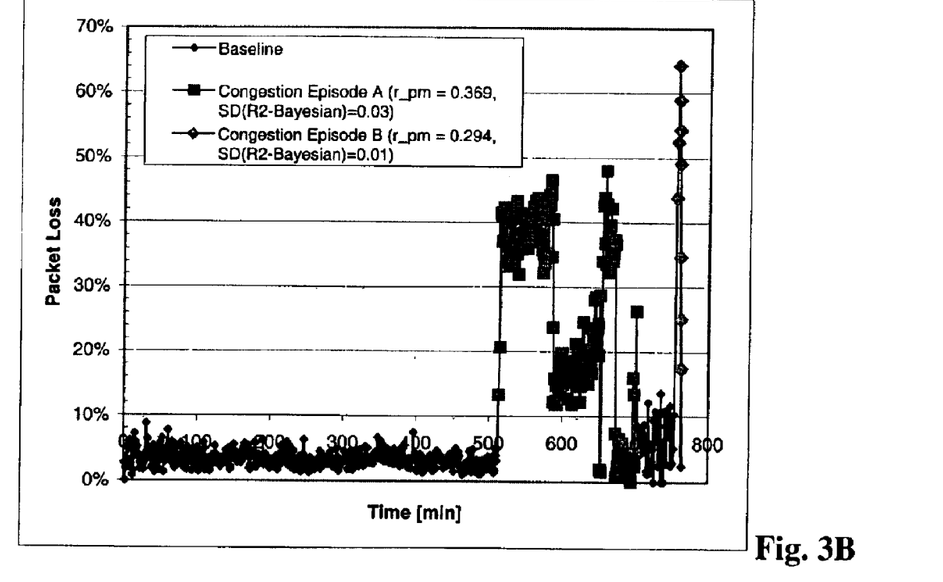
Figure 3C:
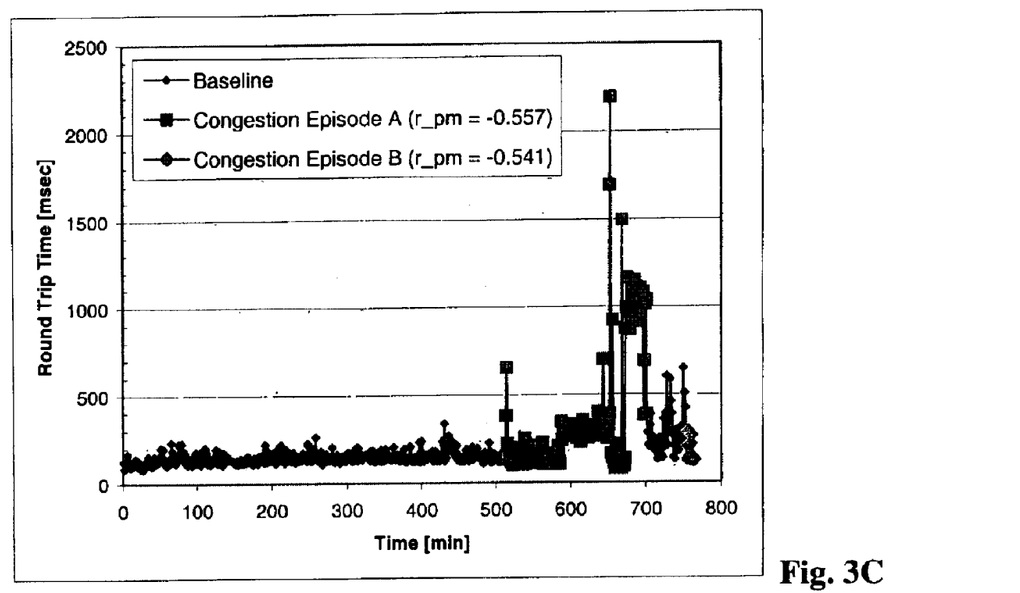
Figure 3D:
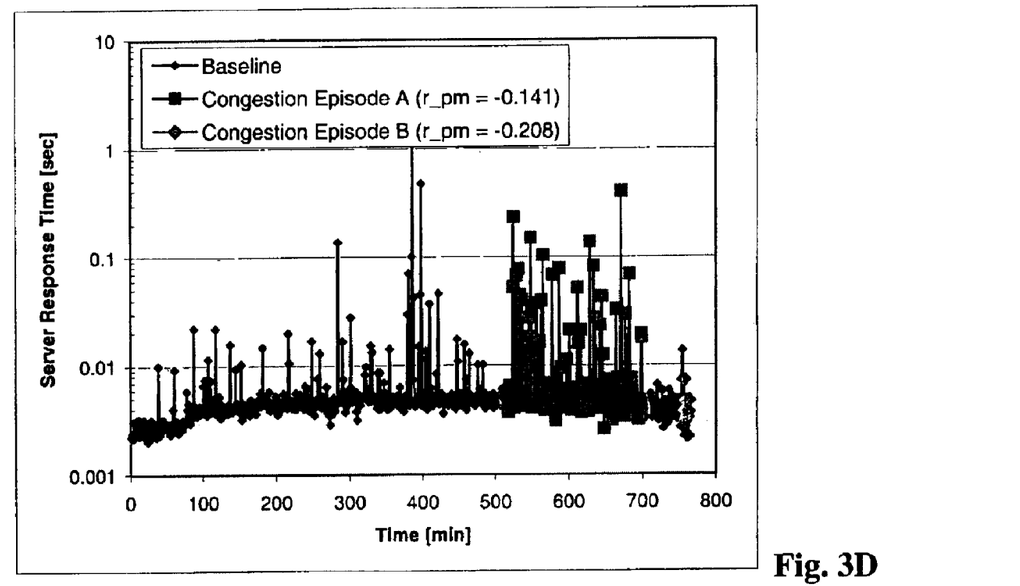
Figure 3E:
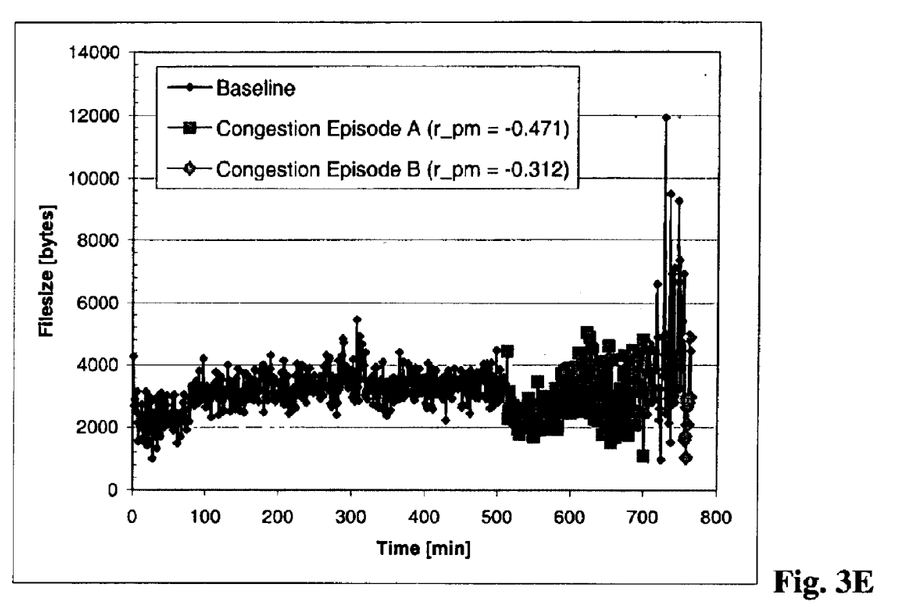

FIG. 3B illustrates a plot of Internet traffic packet loss data collected over the same time interval. That is, this plot is the packet loss information associated with the same Internet traffic for which duration information is shown in FIG. 3A. Similarly, FIG. 3C is a plot of round trip times for this same Internet traffic, FIG. 3D is a plot of server response time for this Internet traffic and FIG. 3E is a plot of file size for the same Internet traffic.

Applying the methods of the present invention, $r_{pm}$ values for data included in each of the congestion episodes for each performance metric were determined. The corresponding Bayesian statistical property (in this case standard deviation) was calculated for each metric and the result for the packet loss data is shown in the legend for the plot shown in FIG. 3B. Notice that in this case, $r_{pm}$ for the packet loss data is much larger, in each instance (congestion episode A and congestion episode B) than the corresponding Bayesian value. This indicates a very low probability that the $r_{pm}$ value is due simply to normal statistical fluctuations and we conclude, therefore, that packet loss is the metric most probably associated with the congestion episodes.

Thus, a method for correlating congestion episodes to performance metrics in Internet traffic has been described. However, although the above description included examples of presently preferred techniques, it should be remembered that the true scope of the invention should only be measured in terms of the claims, which now follow.

What is claimed is:

1. A computer based method, comprising:
   for each of a number of network performance metrics collected by a network monitor, computing an associated value $r_{pm}$ that represents a difference between a first correlation coefficient $r_1$ computed by the network monitor for a baseline data set and a second correlation coefficient $r_2$ computed by the network monitor for a second data set that includes the baseline data set and other data points classified as duration outliers, the first and second correlation coefficients for each network performance metric representing correlation between that network performance metric and durations of network connections; and
   selecting that network performance metric that has a largest associated $r_{pm}$ value of all $r_{pm}$ values computed as representing a root cause of the duration outliers.

2. The method of claim 1 wherein the network performance metrics include one or more of round trip time, server response time, packet loss and file size.

3. The method of claim 1 wherein the duration outliers are classified using one or more of Grubb's Test, Rosner's Test and Walsh's Test.

4. The method of claim 1 wherein the duration outliers are classified using information from the network performance metrics.

5. The method of claim 4 wherein the network performance metrics include one or more of round trip time, server response time, packet loss and file size.

6. A computer based method, comprising:
   for a first set of data points regarding Internet traffic collected by a network monitor, each data point having a number of associated parameters, eliminating outliers as determined according to statistical properties of at least one of the associated parameters from the set of data points collected by the network monitor to produce a baseline;
   computing, for each of one or more of the associated parameters, a first correlation coefficient $r_1$ between connection duration and that associated parameter for the baseline;
   computing, for each of the one or more of the associated parameters, a second correlation coefficient $r_2$ between connection duration and that associated parameter for the first set of data points;

computing, for each of the one or more of the associated parameters, a difference $r_{pm}$ between $r_2$ and $r_1$ for that associated parameter; and selecting a corresponding one of the associated parameters that has a largest $r_{pm}$ value of all $r_{pm}$ values computed as representing a root cause of the outliers.

7. The method of claim 6 wherein the associated parameters include file size, server response time, packet loss and latency.

8. The method of claim 7 wherein the at least one of the associated parameters comprises connection duration.

9. The method of claim 6 wherein the outliers are determined using one or more of Grubb's Test, Rosner's Test and Walsh's Test.

10. The method of claim 6 wherein the outliers are determined using information from the associated parameters.

* * * * *